(12) United States Patent
Zolotow et al.

(10) Patent No.: US 10,884,732 B1
(45) Date of Patent: Jan. 5, 2021

(54) AUTOMATION UTILIZING INFRASTRUCTURE AS CODE MODULES

(71) Applicant: INTERNATIONAL BUSINESS MACHINES CORPORATION, Armonk, NY (US)

(72) Inventors: Clea Anne Zolotow, Key West, FL (US); Selcuk Nedim Oezmen, Castrop-Rauxel (DE); Mihai Criveti, Blanchardstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/555,485

(22) Filed: Aug. 29, 2019

(51) Int. Cl.
*G06F 8/76* (2018.01)
*G06F 9/445* (2018.01)

(52) U.S. Cl.
CPC ............ *G06F 8/76* (2013.01); *G06F 9/44521* (2013.01)

(58) Field of Classification Search
CPC ..... G06F 8/71; G06F 8/70; G06F 8/76; G06F 9/44521
USPC ........................................ 717/107, 162–178
See application file for complete search history.

(56) References Cited

U.S. PATENT DOCUMENTS

| | | | | |
|---|---|---|---|---|
| 10,114,616 B2 * | 10/2018 | Delaney | ..................... | G06F 8/30 |
| 10,255,370 B2 * | 4/2019 | Carpenter | ........... | G06F 16/9024 |
| 10,416,976 B2 * | 9/2019 | Nakanoya | ................. | G06F 8/60 |
| 10,564,987 B1 * | 2/2020 | Lepine | ...................... | G06F 8/65 |
| 10,656,918 B2 * | 5/2020 | Delaney | .................... | G06F 8/20 |
| 10,705,864 B2 * | 7/2020 | Rabasa | ............... | G06F 9/44526 |
| 10,719,311 B2 * | 7/2020 | Foskett | ................. | G06F 9/5072 |

(Continued)

FOREIGN PATENT DOCUMENTS

WO        2019067747 A1     4/2019

OTHER PUBLICATIONS

Nuwan Goonasekera et al., CloudBridge: A Simple Cross-Cloud Python Library, XSEDEI6 Proceedings of the XSEDEI6 Conference on Diversity, Big Data, and Science at Scale, ACM.

(Continued)

*Primary Examiner* — Marina Lee
(74) *Attorney, Agent, or Firm* — Maeve Carpenter; Matthew M. Hulihan; Heslin Rothenberg Farley & Mesiti PC

(57) ABSTRACT

Automation using infrastructure as code modules is provided by: receiving a service request implicating infrastructure elements for provisioning in a target hosting environment, selecting atomic Infrastructure as Code (IaC) modules comprising code definitions for execution to provision the infrastructure elements in the target environment, the atomic IaC modules being selected from a library of predefined executable atomic IaC modules that include atomic IaC modules for execution to provision varying infrastructure elements in varying hosting environments including the target environment, transforming the service request into a technical workflow using the selected atomic IaC module(s) and transformation templates that direct invocation of the atomic IaC modules using desired parameters for provisioning the infrastructure elements in the target hosting environment, and initiating orchestration of the provisioning of the infrastructure elements in the target environment via execution of the selected set of atomic IaC modules.

20 Claims, 11 Drawing Sheets

(56) References Cited

U.S. PATENT DOCUMENTS

| | | | | |
|---|---|---|---|---|
| 2017/0026416 | A1* | 1/2017 | Carpenter | H04L 41/0866 |
| 2017/0192765 | A1* | 7/2017 | Smith | G06F 9/505 |
| 2018/0039487 | A1* | 2/2018 | Delaney | G06F 8/20 |
| 2018/0203680 | A1* | 7/2018 | Nakanoya | G06F 9/48 |
| 2018/0321919 | A1* | 11/2018 | Delaney | G06F 8/30 |
| 2018/0341502 | A1* | 11/2018 | Rabasa | G06F 9/453 |
| 2019/0079750 | A1* | 3/2019 | Foskett | G06F 8/71 |
| 2019/0079751 | A1* | 3/2019 | Foskett | G06F 9/5072 |
| 2019/0294477 | A1* | 9/2019 | Koppes | G06F 9/5072 |
| 2019/0318012 | A1* | 10/2019 | Danilov | G06N 5/022 |
| 2020/0012480 | A1* | 1/2020 | Rizo | H04L 67/34 |

OTHER PUBLICATIONS

Mell, Peter, et al., "The NIST Definition of Cloud Computing", NIST Special Publication 800-145, Sep. 2011, Gaithersburg, MD, 7 pgs.

"Service Catalog + Infrastructure as Code = Speedy Delivery". Retrieved on Jun. 14, 2019 from the Internet URL: <https://community.servicenow.com/community?id=community_article&sys_id=9aac6625dbd0dbc01dcaf3231f961924>, 2019 ServiceNow, 3 pgs.

"AWS Service Catalog". Retrieved on Jun. 14, 2019 from the Internet URL: <https://www.digitalmarketplace.service.gov.uk/g-cloud/services/713052357965107>, Methods Business and Digital Technology Limited, 15 pgs.

* cited by examiner

AUTOMATION UTILIZING INFRASTRUCTURE AS CODE MODULES

BACKGROUND

Aspects of business process management (BPM) include the construction and use of patterns for automated deployment. A 'service catalog' includes an identity of available services, each service having a corresponding pattern definition (sometimes referred to as a "pattern"). Generally speaking, a pattern for a service is a set of parameter value ranges that define in which circumstances it is appropriate to use the corresponding service. Value ranges can be provided for the following parameters, as examples: operating system, virtual machine (VM) size, management characteristics, environment type, and application type. Additionally or alternatively, other parameters related to a provision of information technology services may be used. Patterns can specify hardware and/or software, though in many examples specify just hardware. A workflow then creates what the pattern specifies. Conventionally, these patterns are single-use; heavy-weight compute partitions (either VMs, or logical partition (LPAR) or dedicated, bare metal servers), middleware, and database systems that are all tightly coupled to a full functioning computer system are utilized to serve a specific service requested by the pattern.

SUMMARY

Shortcomings of the prior art are overcome and additional advantages are provided through the provision of a computer-implemented method. The method receives a service request implicating computer infrastructure elements for provisioning in a target hosting environment. The method selects a set of atomic Infrastructure as Code (IaC) modules comprising code definitions for execution to provision the infrastructure elements in the target hosting environment. The set of atomic IaC modules are selected from a library of predefined executable atomic IaC modules that include atomic IaC modules for execution to provision varying infrastructure elements in varying hosting environments including the target hosting environment. The method also transforms the service request into a technical workflow using at least the selected set of atomic IaC modules and one or more transformation templates that direct invocation of the set of the atomic IaC modules using desired parameters for provisioning the infrastructure elements in the target hosting environment. The method additionally initiates orchestration of the provisioning of the infrastructure elements in the target hosting environment via execution of the selected set of atomic IaC modules.

Further, a computer system is provided that includes a memory and a processor in communication with the memory, wherein the computer system is configured to perform a method. The method receives a service request implicating computer infrastructure elements for provisioning in a target hosting environment. The method selects a set of atomic Infrastructure as Code (IaC) modules comprising code definitions for execution to provision the infrastructure elements in the target hosting environment. The set of atomic IaC modules are selected from a library of predefined executable atomic IaC modules that include atomic IaC modules for execution to provision varying infrastructure elements in varying hosting environments including the target hosting environment. The method also transforms the service request into a technical workflow using at least the selected set of atomic IaC modules and one or more transformation templates that direct invocation of the set of the atomic IaC modules using desired parameters for provisioning the infrastructure elements in the target hosting environment. The method additionally initiates orchestration of the provisioning of the infrastructure elements in the target hosting environment via execution of the selected set of atomic IaC modules.

Yet further, a computer program product including a computer readable storage medium readable by a processing circuit and storing instructions for execution by the processing circuit is provided for performing a method. The method receives a service request implicating computer infrastructure elements for provisioning in a target hosting environment. The method automatically selects a set of atomic Infrastructure as Code (IaC) modules that include code definitions for execution to provision the infrastructure elements in the target hosting environment. The set of atomic IaC modules are selected from a library of predefined executable atomic IaC modules that include atomic IaC modules for execution to provision varying infrastructure elements in varying hosting environments including the target hosting environment. The method also transforms the service request into a technical workflow using at least the selected set of atomic IaC modules and one or more transformation templates that direct invocation of the set of the atomic IaC modules using desired parameters for provisioning the infrastructure elements in the target hosting environment. The method additionally initiates orchestration of the provisioning of the infrastructure elements in the target hosting environment via execution of the selected set of atomic IaC modules.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
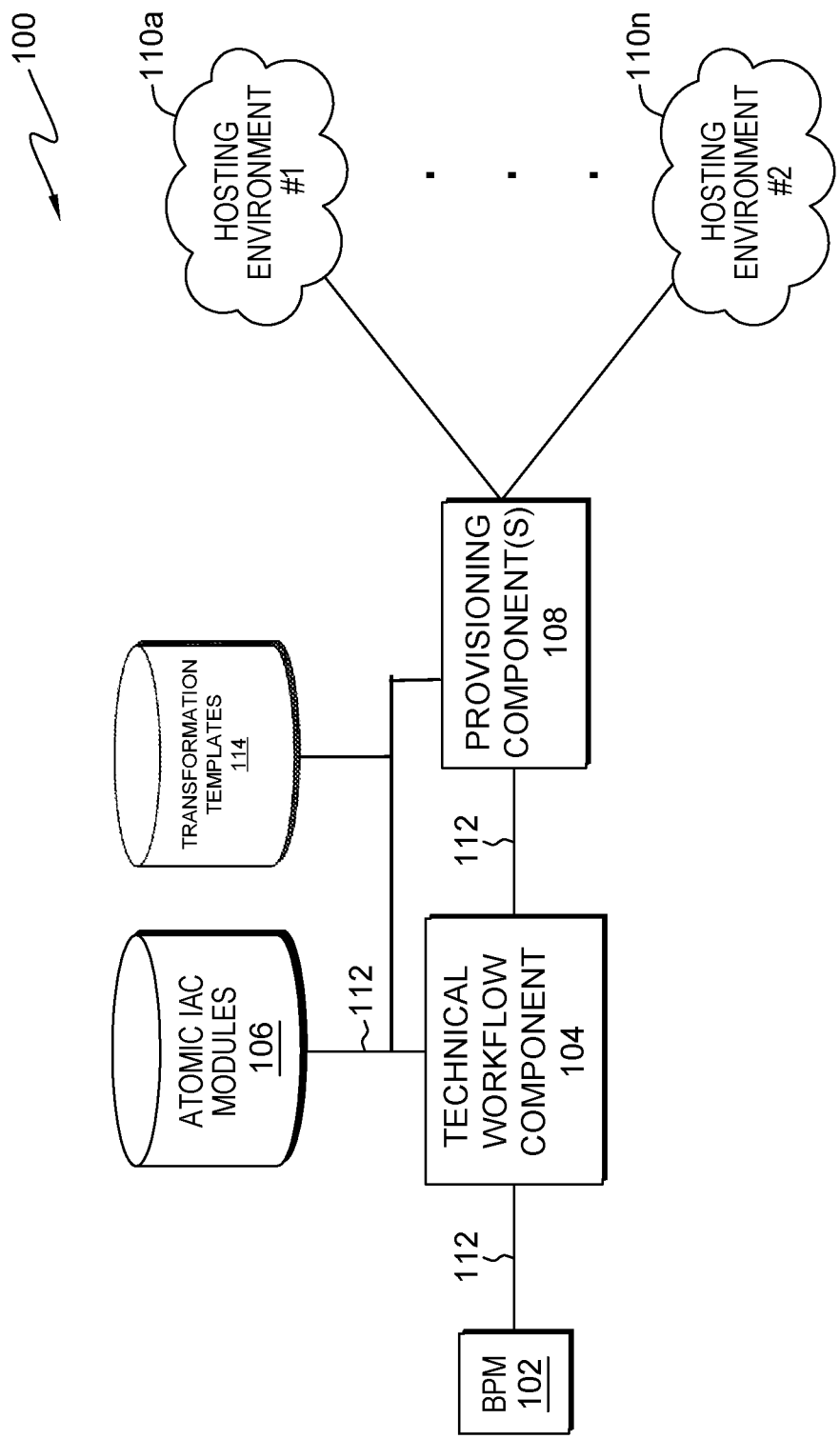
FIG. 1 depicts an example environment to incorporate and use aspects described herein.

Described herein are approaches for automation of infrastructure element provisioning utilizing Infrastructure as Code (IaC) modules/elements. Conventional tightly-coupled, 'single-use' patterns are difficult to maintain, serving only a single purpose and being cumbersome with respect to change of version, new technologies, new technology capabilities and/or changes in approval or provisioning processes. The service catalog presents a collection of IT assets/services brought up ('instantiated') by one or more patterns. However, it would be useful for modern self-service catalogs to be more dynamic and focus on business needs while utilizing IaC-facilitated automation. Aspects presented herein provide such IaC-based automation through the use of atomic IaC modules and specific transformation templates for invoking the atomic IaC modules, to guide the workflows produced to invoke the desired infrastructure elements. The atomic IaC modules inform what infrastructure elements (hardware and/or software) are available on various different service provisioning environments (also referred to herein as "hosting" environments or architectures), which encompass cloud environment(s) and on-premises environment(s). These can then be factored into desired patterns. For example, a compute element in a specific on-premises environment could be a virtual machine (VM) but in a specific off-premises environment could be a container. The service requested by the requestor/user might be for 'compute power' and indicate a target hosting environment (e.g. a specific on-premises or off-premises environment). The appropriate atomic IaC module is selected to provision, i.e. the compute power in this example, pursuant to a transformation template that indicates the appropriate parameters to invoke the atomic IaC modules to configure the compute element and achieve the request. The request which can be specified at a relatively high level. This provides both flexibility and ease of maintenance in providing a platform for provisioning infrastructure elements. For instance, it allows for the generation of agile transformation templates that can be moved between cloud environments and/or to on-premise deployments that utilize identical or similar business rules, but are flexible with respect to the target hosting infrastructure and therefore the atomic IaC modules that they parameterize for invocation of those modules.

By way of example, a customer may desire a load balancer and compute power. The service request could indicate a desire for 'compute power that is part of a load balancing environment'. In some examples, the specification is more detailed (e.g. a virtual machine in place of compute power, for example). The service request is an order for infrastructure element(s), which are implicated by the request. The service request elements include 'compute power' and 'load balancer', and might have a different implicated infrastructure element implementation depending on the target architecture/hosting environment. Both VMs and containers provide compute power, for instance. It is also noted that these two elements might themselves be implemented using one or more infrastructure elements corresponding to one or more atomic IaC modules. In addition, the customer may have specific rules for security (password length, encryption, etc.), network specifications, and other 'parameters' of the infrastructure elements. Consequently, transformation templates can be produced that indicate these rules/parameters, and these templates can be agnostic to the particular hosting architecture, but tailored to the particular customer-desired 'environment'. A transformation template might, for example, specify that a VM to be instantiated by an atomic IaC modules is to be instantiated with a given (in the template) set of specifications. The same or another transformation template might specify a length of 15 characters for any user/logon password configured that VM.

Conventional BPM-created patterns are generally unique and provide specific code for a given infrastructure in a specific environment. In contrast, the use of atomic IaC modules and transformation templates that direct invocation of those modules using desired parameters facilitates reusability and flexibility. The transformation templates may be reused for differing atomic IaC modules corresponding to different hosting architectures but which templates state parameters (e.g. a password length or encryption standard to use, for instance) for the infrastructure element regardless of the host architecture selected. The service request can be decomposed into, e.g., atomic elements, business workflows, and technical workflows. The service requests/requested patterns are genericized; rather than requesting a specific load balancer by defining the details of the load balancer, the pattern could request 'load balancing' functionality, for example. The service requests patterns are generally user-specified. In some examples, rather than the user coding the pattern, the user uses a tool, such as BPM software, to build a service request that composes the initial pattern based on BPM rules. Then, appropriate atomic IaC module(s) and transformation template(s) are selected for implementing the requested service request. Specifically, a technical workflow is produced for orchestrated provisioning of the infrastructure elements in the target hosting environment.

An atomic IaC module provides a given infrastructure element (or at least a component thereof) in/on a given hosting environment. A given atomic IaC module can be/have a code definition for execution to provide the given infrastructure component, optionally taking one or more parameters (e.g. provided by a transformation template and/or the customer service request itself) for invocation the infrastructure element. In the Amazon Web Services (AWS) cloud computing environment offered by Amazon.com, Inc., as one example, and using the example above to provision a compute component with load balancing, one atomic IaC module could provide a 'standard VM in AWS', another atomic IaC module could provide a load balancer component in AWS, and yet another atomic IaC module could provide the configuration of a specific load balancer rule in AWS. There will be a technical workflow to create the request-specific pattern, for instance creating a load balancer rule, creating a VM, and configuring the load balancer. A 'runbook' or checklist can specify which steps are needed in order to create the pattern. Those steps can be decomposed into identifiable atomic IaC modules made available in a library of objects (e.g. atomic IaC modules). Example infrastructure elements provisioned by atomic IaC modules include, but are not limited to, computational infrastructure elements (virtual machines, containers, and the like), network connectivity infrastructure elements, firewall service infrastructure services, middleware infrastructure elements, database infrastructure elements, input/output infrastructure elements, and operating system infrastructure elements, as well as other elements that may be desired. Some infrastructure elements provide hardware-type infrastructure, while some are software-defined infrastructure elements, for instance network services. Other software type infrastructure includes middleware items such as IBM Web Sphere® and database items such as DB2®, for example, both of which are offered by International Business Machines Corporation (of which Web Sphere and DB2 are registered trademarks).

Each atomic IaC module of the library of available atomic IaC modules can be specific to a given hosting environment, meaning it includes code/definitions for execution to provision an element in/on that given hosting environment. In many situations, the atomic IaC module could be a mere code snippet to implement a particularized function. Multiple varying target hosting environments can therefore be supported by including atomic IaC modules to provision elements on the different hosting environments. A group of atomic IaC modules in the library can be for execution to provision a common type of infrastructure element, for instance a virtual machine type of infrastructure element. Example types of a virtual machine include a z/VM® in the z/Architecture® offered by International Business Machines Corporation (of which z/VM and z/Architecture are registered trademarks), a VM under a z/VM® virtual machine, and a VM hosted on an ESXi hypervisor offered by VMWare, Inc., Palo Alto, Calif., as examples. Thus, within the group of atomic IaC modules for providing a VM, each atomic IaC module can be for execution to provision that common type of infrastructure element a VM) in a given hosting environment of the varying hosting environments. In other words, the different IaC modules of the group are to invoke the same type of infrastructure element (a VM), but in different environments.

Similarly, a group of atomic IaC modules in the library can be for execution to provision differing types of infrastructure elements, in differing hosting environments of the varying hosting environments, that perform a common function. For instance, a VM and a container are different types of infrastructure elements that perform the common function of providing compute power, i.e. performing computing. A service request could request compute power. If requested in a first hosting environment, this could result in provision of a VM in the first environment (if VM is the default or only compute resource of the environment). If instead the service request indicates a second, different, hosting environment, this could result in provision of a container in that second environment. The common function in this example is 'compute power' but the type of infrastructure element provisioned on that basis could be dictated by what the selected target hosting environment supports.

It is noted that the atomic IaC modules likely contain code that is heavily specific to the hosting environment's specification as to how to invoke the subject infrastructure element in the hosting environment. Example hosting environment providers include, but are not limited to, International Business Machines Corporation of Armonk, N.Y.; Amazon.com, Inc. of Seattle, Wash.; Google LLC of Mountain View, Calif.; and Microsoft Corporation of Redmond, Wash. The provider of the environment may push out or otherwise publish a specification of code or definitions to invoke the available infrastructure elements. Additionally or alternatively, in cases where such information is not published or made readily available, for instance as may be the case with some private cloud or on-premises environments, a search facility could search for available services/elements and discover how to invoke them in order to build the specification.

In this manner, a library of predefined executable atomic IaC modules may be maintained, which can include discovering provisionable infrastructure elements of the varying hosting environments and definitions for invoking the provisionable infrastructure elements in the varying hosting environments. For instance, in a 'greenfield' deployment scenario, a new hosting environment may be identified to be supported for receiving service requests to provision particular infrastructure elements in the new hosting environment. Based on identifying the new hosting environment, a specification may be retrieved and/or built to inform both which atomic IaC modules can be built and the code/definitions of those various atomic IaC modules. Additionally or alternatively, maintaining the library can include monitoring those environments for changed declarations, definitions, runbooks, or the like, in situations where specific code to invoke elements is changed or added. Corresponding atomic IaC modules can be edited or added to the library in that case.

The code of the atomic IaC modules can be written manually or automatically in some embodiments. In addition, the IaC modules themselves could be written by any desired entity, which may be the same or a different entity than the entity maintaining the library. In any case, that entity maintaining the library obtains and stores to the library the changed or additional atomic IaC modules. In some examples, based on changes to a definition for invoking a given infrastructure element, a corresponding atomic IaC module in the library that is based on the changed definition is updated. By way of specific example, if the manner for invoking a virtual machine and/or providing parameters thereof changes in a given hosting environment, the corresponding atomic IaC module for invoking that virtual machine on the hosting environment can be edited accordingly.

Similarly, transformation templates for how to configure specific infrastructure elements being invoked by the atomic IaC code modules, for instance indicating the parameters required to invoke the atomic IaC modules to configure the specific infrastructure elements according to any desired specifications explicitly provided in the service request or implicitly known based on the particular customer's preferences, can be written manually (e.g. by a user/customer) or automatically in some embodiments.

The overall deployment of an infrastructure derives from the specified business rules, but the particular atomic IaC modules used for a given task will vary according to the hosting environment selected. The atomic IaC modules and/or transformation templates can be changed or adapted according to which hosting environment is selected and/or which customer parameters are desired. If a user desires to migrate from AWS to the Google Cloud Platform (GCP) offered by Google LLC, this could be effected by a mere change to the selected atomic IaC modules. The change would be a change from those which implement the appropriate infrastructure elements in AWS to those which implement the appropriate infrastructure elements in GCP in such a scenario, rather than a change in the entire business workflow or full stack deployment pattern. The transformation templates can provide the 'blueprint' that holds the information specifying the specific atomic IaC modules and/or parameters for provisioning the desired infrastructure, and switching from one hosting environment to another could be implemented merely by changing hooks in the blueprint to point to the atomic IaC modules for the other hosting environment.

Accordingly, aspects described herein utilize IaC as part of the deployment utilized by policies in software, for instance BPM software, for atomic elements and transformation templates that are fungible. That is, different atomic IaC elements and transformation templates directing their invocation offer differing implementations based on the type of cloud and business need. This decouples business rules and approval workflow, for instance approvals required to maintain proper cost allocations, from actual technical deployment requirements.

Cross-cloud implementation could utilize atomic elements and therefore be customized for optimal delivery within each cloud segment, examples of which pertaining to operating systems include Red Hat Enterprise Linux (RHEL) for the IBM Cloud™ (a trademark of International Business Machines Corporation), and Ubuntu® for AWS (UBUNTU is a registered trademark of Canonical Ltd, London, United Kingdom) as examples. Aspects can utilize IaC code segments as atomic building blocks, orchestrated by, e.g., Business Process Model and Notation (BPMN) applications(s) and governed by a brokerage component, such as IBM Cloud Brokerage Managed Services offered by International Business Machines Corporation, as examples.

In addition, aspects can facilitate the migration of legacy environments to microcontainer or automation in operations. Conventionally, compute partition acquisition and deployment are not seen on a same level as containerization services and functions as a service. By deploying IaC requirements, the deployment of a physical resource (such as an LPAR, VM or container) can be based on business rules/mappings that can change and flex according to the requirements. This can enhance migration from legacy systems to a container/microcontainer environment and make the service catalog more agile.

By way of specific example, conventionally when requesting an ERP system, such as a SAP ERP system offered by SAP SE, Walldorf, Germany, and which is a relatively complicated system with direct rules, an implementation design sheet specifying target IP ranges, host names, network port connectivity, firewall rules, storage layout, and more is created. This is typically a cumbersome and error prone activity required to fully maintain change control, proper cost allocation, and to comply with various configuration management requirements. Utilizing atomic design elements as disclosed herein, the business process management software in which the infrastructure is requested will already have knowledge that a request for a SAP ERP system implies that an atomic IaC module for 'IP_Range' (among various other IaC modules) is needed. The atomic IaC module 'IP range' will be invoked, for instance based on an appropriate transformation template, to provide an available IPv4 and/or IPv6 range. Other example infrastructure element(s) implicated by the request would be required firewall rule(s). This would go to a 'Firewall_Rule' atomic IaC module. Mappings are provided between elements of the service request (elements of a SAP ERP system) and infrastructure elements needed, which correlate to certain atomic IaC module(s) in the library given the target hosting environment.

FIG. 1 depicts an example environment 100 to incorporate and use aspects described herein. BPM software/tool 102 is in communication with a technical workflow component 104 that builds technical workflows described herein. The technical workflow component 104 accesses and selects atomic IaC modules stored in a repository/library 106 of atomic IaC modules and selects and uses blueprints represented by transformation patterns/templates of library 114 to direct invocation of the selected atomic IaC modules to provision the infrastructure elements implicated by a service requests.

A transformation template can include the parameters required to invoke one or more atomic IaC modules to configure a specific infrastructure component (for instance a firewall, a specific network route, a specific loadbalancer, a specific proxy, etc.) as well as potentially invoking configuration scripts for individual configuration scripts. The transformation templates can be a set of rules of how to setup a specific system in the context of a customer-specific environment. Creating a template can be a manual and/or automated process, and depend heavily on the requirements for the target infrastructure, e.g. security rules, names of network or storage devices, and so on. A transformation template can then be used to transform a service request into a customer-specific request into a specific technical workflow that sets-up and configures the IaC modules to provision the requested service.

The atomic IaC modules and template(s) selected can be based on the initially requested service request and optionally further based on knowledge about customer rules, specifications, etc. The request 'I want a new VM/service in my Test environment' could cause the technical workflow component to select the atomic IaC modules for, e.g., a VM and then select the transformation template that directs how to configure the VM according to customer-desired specifications. In this example the libraries 106 and 114 are separate, but they could instead be part of the same repository in some embodiments. A transformation template is a guide for provisioning a desired infrastructure element in a target hosting environment, e.g. a cloud environment or an on-premise environment, for instance. The technical workflow informs the provisioning to occur, while actual provisioning using the code of the selected atomic IaC modules is implemented by provisioning component(s) 108, which provision the infrastructure elements in the target hosting environment. The target is selected from a collection of available hosting environments 110a, . . . , 110n. A hosting environment 110 is a set of hardware and/or software resources for hosting services. In some examples, the technical workflow directs the provisioning to occur through requests/responses from the provisioning components 108. It may be that the technical workflow component invokes provisioning component(s) 108 to provision one or more components, wait for responses, then continues with invocation of next tasks in the workflow, for instance to further configure provisioning infrastructure elements or to provision additional infrastructure elements.

Components 102, 104, 106, 108 and 114 are executed/provided on one or more computer systems. In some examples, the BPM tool 102 is executed on a user computer system or computer system of a private network, and component(s) 104, 106, 108 and 114 are executed/provided on or by other computer system(s), such as servers of a hosted environment (which may be any hosting environment 110a, . . . , 110n or a different hosting environment altogether).

In addition, components 102, 104, 106, 108, 110 and 114 may communicate with each other via communications links 112. They could, for instance, form wired or wireless network(s), with communication between components taking place via wired or wireless communications links 112 for communicating data between the components. Network(s) can include any one or more networks, such as one or more local area networks and/or one or more wide area networks, such as the internet. Communications links 112 can be any wired or wireless communications links, such as wired and/or cellular, Wi-Fi, or other types of wireless connections. FIG. 1 is just one example of an environment to incorporate and use aspects described herein.

In a BPM tool (e.g. 102 of FIG. 1) when programming, the user can view a service catalog and specify at a high level the user's request. In this regard, options for selection among available infrastructure elements can be presented by the BPM tool to a user for selecting. The user might specify that the user wants 'a VM' and the software can prompt the user to indicate an environment in which to provision the VM. A different runbook can be provided for each of the environments. The technical workflow (e.g. by component 104) can select the appropriate transformation templates for the customer-specific environment and the appropriate atomic IaC module(s) to create that VM in the selected environment, and build the technical workflow/tasks to actually accomplish that creation. In this regard, the software can have intelligence, such as mappings, to know which atomic IaC module(s) are for implementing any given infrastructure element implicated by the user's selection. In some embodiments, the BPM could be used for some of all of the technical workflow aspects, however, for the sake of portability and flexibility, in some embodiments the technical workflow aspects are, as in FIG. 1, not implemented as part of the BPM, which would instead be focused on the service catalog and the approval workflows. A request for a 'load balanced VM' might be mapped to functions for (i) creating a VM, (ii) creating a load balancer, (iii) and provisioning networking services to support a given number of users, among other functions. In conjunction with the library of atomic IaC modules, there can be some automation involved in the selection of which atomic IaC modules to use based on the service request constructed by the user using the BPM software.

The BPM thereby enables the specification of what the user desires (construction of the service request), and the service request is created in a generic sense but implicates various infrastructure elements and parameterizations of their instantiation via atomic IaC modules. A component of the environment, for instance the technical workflow component 104, receives a service request implicating the computer infrastructure elements for provisioning in the target hosting environment. For instance, the service request is constructed of selected catalog elements, and what is selected implicates infrastructure elements that are to be provisioned. Based on that specification, the proper atomic IaC modules are selected to compose the proper infrastructure elements properly. Conventionally, the user would order a specific VM, order a specific load balancer, then configure the load balancer, and so on. In contrast, aspects described herein enable the user to order more generic elements for a specific environment, and the proper atomic IaC modules can be automatically selected. The technical workflow component can identify, for instance via transformation templates, the proper steps to be performed with the proper parameters and in the proper order to provision the desired infrastructure. Based on the input from the request in the BPM tool, the appropriate atomic IaC modules and transformation templates are selected and transformed into a technical workflow to effect the proper provisioning of the desired elements.

As noted, an advantage is that it is not necessary to change an entire transformation template if a different target environment is desired. Instead, the transformation template can be modified, if necessary, to list, hook to, copy, etc. the proper atomic IaC modules written for the different target environment that is desired.

Based on the target hosting environment identified in the BPM tool and on the mappings between elements of the service request and the infrastructure elements implicated by the service request (or other intelligence the system has that maps the elements of the service request to actual infrastructure elements), aspects transform the service request into a technical workflow (i.e. tasks for execution) for provisioning the infrastructure elements in the target hosting environment. An example is to transform a meta-template into a platform (environment)-specific template as discussed and described below with reference to FIG. 2. Using the environment-specific template, a process can select from the library a set of atomic Infrastructure as Code (IaC) modules that includes code definitions for execution to provision the infrastructure elements in the target hosting environment.

Figure 2:
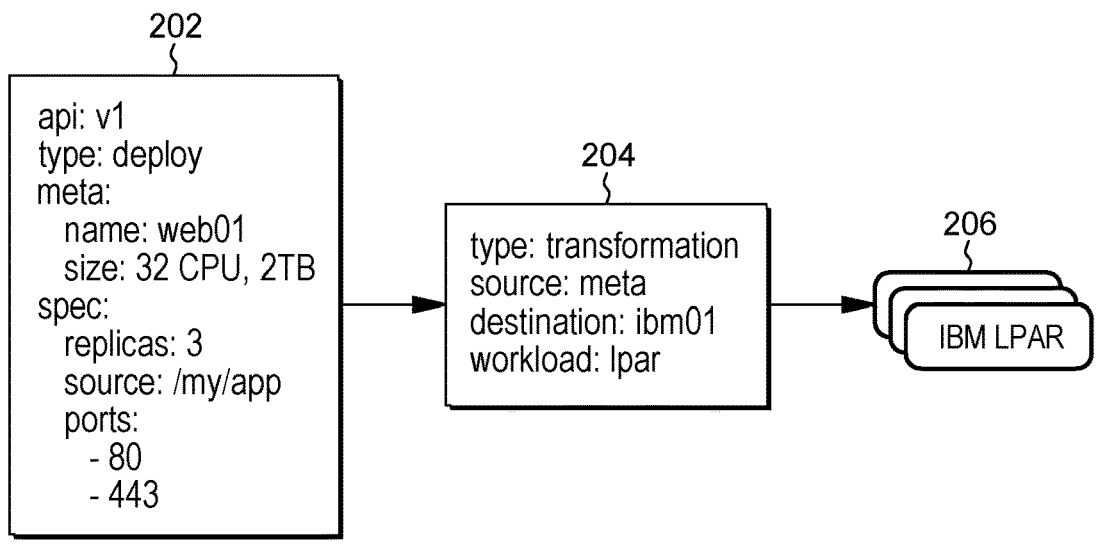
FIG. 2 depicts an example of transforming a meta-template into a platform-specific template for provisioning infrastructure elements, in accordance with aspects described herein.

FIG. 2 depicts an example of transforming a meta-template into a platform-specific template for provisioning infrastructure elements, in accordance with aspects described herein. In FIG. 2, elements 202 and 204 are .YAML ("YAML Ain't Markup Language") files, which is an example known configuration file format. Other examples include .XML and .JASON files, though the templates could be written using any other structured data file format.

An "application.yaml" 202 is an example meta-template. Meta-template 202 can be output from the BPM tool. In this example, the meta-template 202 indicates a request for a web application with three replicas using ports 80, 443. A BPM/BPMN tool and/or 'step' functions can orchestrate rules that transform the meta-template 202 into platform-specific template 204, "transformation.yaml", which specifies the environment and workload. In this example, the destination environment is the IBM Cloud™, specifically the workload 'IBM LPAR' (206) of that hosting environment. Content of the template 204 includes individual building blocks that can be composed to define the desired infrastructure.

The template 204 sets up the calling of atomic IaC module/elements for an IBM LPAR. Since other environments may be available, it may be desired to replace the target hosting environment with a different environment, and possibly the workload with a VM, for instance. In such a case, other atomic IaC modules—appropriate for that other environment—would be selected. Notably, the templates can remain largely the same except with changes to the indicated "destination" and "workload" values according to the specific infrastructure element and environment.

A customer/user can create specific workflows and then reuse transformation template(s) (that can be pointed to whichever element and location required). Within the BPM Business Process Interface (BPI), any approval flows that are customer/user-specific may need to be addressed in developing a transformation template as the initial blueprint, which can contain pointers to the BPI for user-specific information and pointers to the atomic IaC modules.

Figure 3:
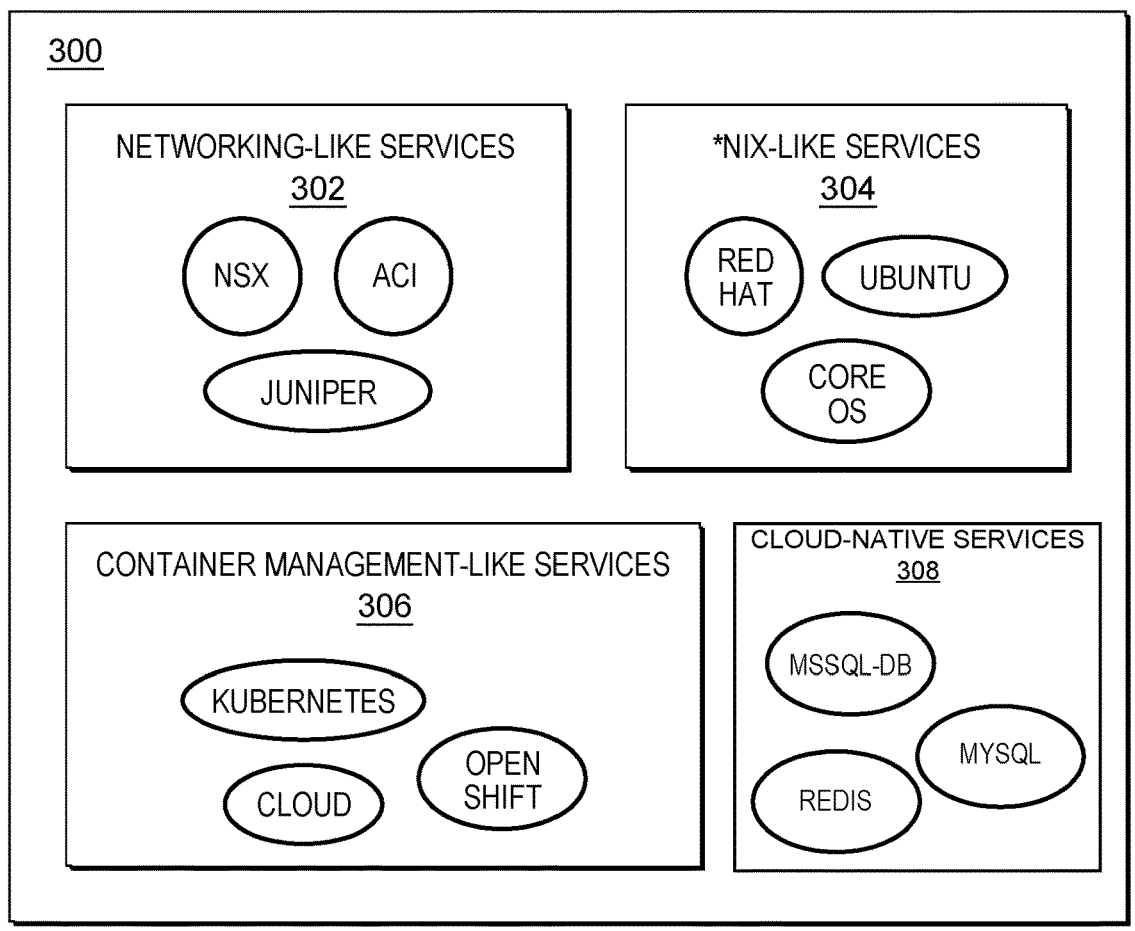
FIG. 3 depicts a conceptual representation of atomic Infrastructure as Code modules of a library, in accordance with aspects described herein.

FIG. 3 depicts a conceptual representation of atomic Infrastructure as Code modules of an atomic IaC module library, in accordance with aspects described herein. Library 300 includes, in this example, atomic IaC modules for depicted networking-like services 302 (networking facilities NSX, ACI and Juniper), *NIX-like services 304 (OS facilities Red Hat Enterprise Linux, Ubuntu, and Core OS), container management-like services 306 (container software Kubernetes, Open Shift, and Cloud), and Cloud-native services for public clouds 308 (mssql-db service, mysql service, and redis service). The cloud-native services 308 could be any category of cloud computing service(s), for instance Infrastructure as a Service (IaaS), Platform as a Service (PaaS), Software as a Service (SaaS), or Function as a Service (FaaS), as examples. The services could be any accessible through a command line interface of any public cloud platform, for example. It is noted that the services and categories presented in FIG. 3 are just example services and categorizes thereof. In practice, atomic IaC modules for many other infrastructure elements and types thereof may be provided in library 300.

The technical workflow component or other component can have the knowledge/mappings to know which modules to use for which requested service elements. If networking services are requested in a legacy data center platform, that networking may require ACI over NSX, for instance. If the platform is AWS, then an NSX extension into AWS may be needed. If in a private cloud environment, a Juniper interface may be needed. UNIX-like services can deploy Ubuntu if in bare-metal, RHEL if on a mainframe, and CoreOS if on another cloud provider, for instance. Containerization management pods can deploy to Kubernetes if on Container-as-a-Service (CaaS) on the IBM Cloud™ and OpenShift when deploying internally, as examples.

The IaC module library provides a set of IaC modules as plug-ins corresponding to different providers for those services. If the user selects AWS as the hosting environment, the system could automatically identify services appropriate for that infrastructure. Since the system typically would not have control over what a given environment uses for given services, for instance its networking services, the system can monitor for that aspect via a custom/self-discovery module and/or a services module that the environment itself provides.

From a given service request, even a basic one like a request for 'load-balanced compute power', potentially several atomic IaC modules and transformation templates are selected. Example types of infrastructure elements that might be implicated by even a basic request include compute, load-balancing, I/O subsystem, firewall, and firewall management components. In some examples, the system can alert a user as to required parameters or additional items not specified by the user when constructing the service request. As an enhancement, the system could make recommendations, or unilaterally decide, to alter a requested element for efficiency or other reasons. For instance, a user might specify a request for a load-balanced VM, but, based on additional knowledge about how the infrastructure will be used or other factors, the system might find this to be overkill and alter the request to provide a container rather than a virtual machine.

Figure 4:
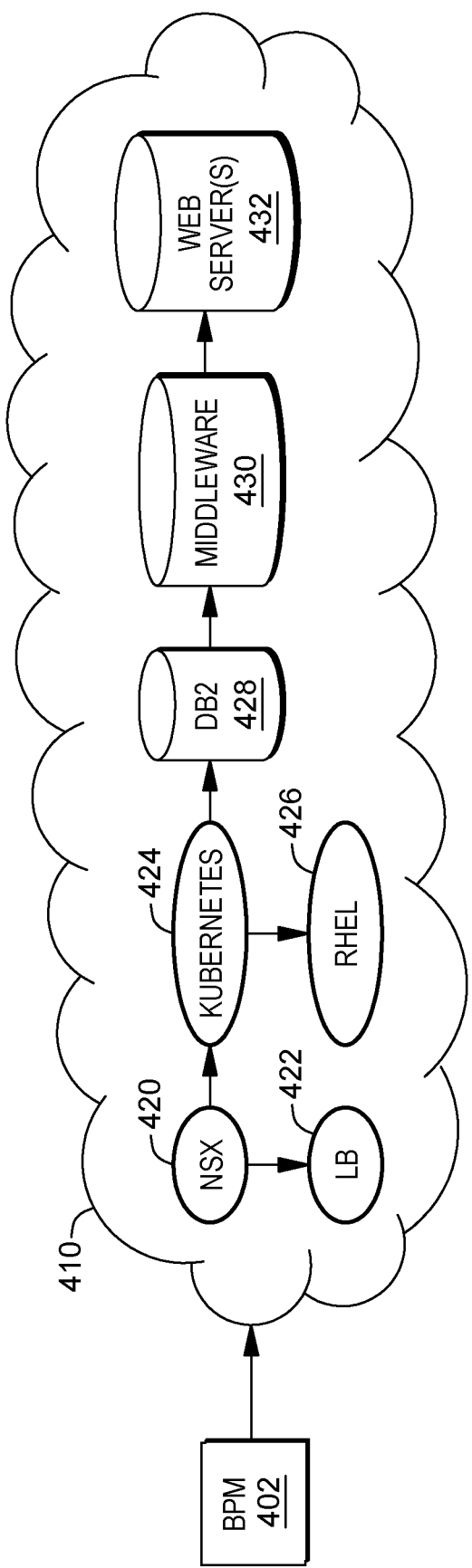
FIG. 4 depicts an example invocation of a network virtualization and security platform fabric to create a load-balancer using atomic Infrastructure as Code modules in accordance with aspects described herein.

FIG. 4 depicts an example invocation of a network virtualization and security platform fabric 410 to create a load-balancer using atomic Infrastructure as Code modules in accordance with aspects described herein. As a specific example, the user requests an NSX fabric offered by VMware, Inc. via BPM tool 402. FIG. 4 shows an example of invocation of NSX 420 to create a load-balancer 422. The components for BPM can be included as part of a cloud brokerage service, as an example. The NSX creates a Kubernetes pod 424 for RHEL OS 426 on IBM Z® architecture, for instance (IBM Z is a registered trademark of International Business Machines Corporation). This would then create a three-tier application between DB2 428, middleware 430 such as Web Sphere®, and web facing servers 432, all supported by the load balancer 422. Each component 420-432 is brought-up by a respective one or more atomic IaC modules.

An example architectural layout of the BPM workflow is as follows. YAML-based workflows contain items in YAML format exemplified above, for example the IP address ranges and the firewall instantiation rules that are part of a SAP LPAR generation. The BPM software calls the workflows and checks for appropriate approval flow(s). An approval flow denotes whether the process can be run automatically or requires specific approvers in change control, for instance production changes. Approvals are well-known in workflows. Often they are budget-based. In accordance with aspects described herein, the approvals could be flexible, where leeway is given according to the particular target environment in which to provision the desired infrastructure. Ranges or specific values could be given based on the infrastructure. An example flexible approval may be a first amount of money for a solution (e.g. a VM) in one environment but a second, different amount of money for a corresponding solution (e.g. a VM, container, or the like) if implemented in a second environment. As an enhancement, the system could factor flexible approval parameters—costs, specified environments, latency, region, automatic vs. manual approvals—into a decision making process to determine or suggest which environment to use as the target environment, even if the user specified a target environment, and/or what specific components within an environment to use, given the constraints specified by the flexible approvals.

Thus, aspects can integrate with a workflow approval process in which provisioning of at least some of the infrastructure elements is subject to one or more flexible approvals. Parameters of the one or more flexible approvals can differ according to the hosting environment in which the infrastructure elements are to be provisioned. Furthermore, transforming a service request into a technical workflow can consider the parameters of a flexible approval to inform optimized selection among available infrastructure elements to provision and/or the platform to use in fulfilling a service request, based on requirements and adjusted for optimal cost, integration etc. Even if the user specified a target environment (or none is specified in the service request), the system can figure out a "best" cloud offering. It is noted that this may be directed toward a sub-optimal offering in some examples, for instance based on BPM issues.

Then, appropriate atomic IaC modules (for instance for IP Address range and Firewall Instantiation) can be invoked via a step function (see the YAML code above). Step-functions investigate the to-be infrastructure (specified by the user or chosen based on the above) and can create a blueprint. The blueprint can contain the actual items to be created for that particular architecture. The 'free IP address range' and 'firewall' elements could be different depending on which hosting environment is selected, and can be associated with different atomic IaC modules from the library. Supported OS services can also be different (according to the workflows, the user might choose different standards in each cloud).

The technical workflow invokes an orchestration layer, and the request for services (to create a SAP LPAR in this example) is executed in the correct place and is completed. A technical workflow component can therefore initiate the orchestration of the provisioning of the infrastructure elements in the target environment via execution of the selected set of atomic IaC modules. Actual provisioning may be performed by the provisioning component(s) (#108 of FIG.

1), which could be separate component(s) from that performing the technical workflow orchestration described above to select the atomic IaC modules and technical transformation templates to satisfy the service request.

Figure 5:
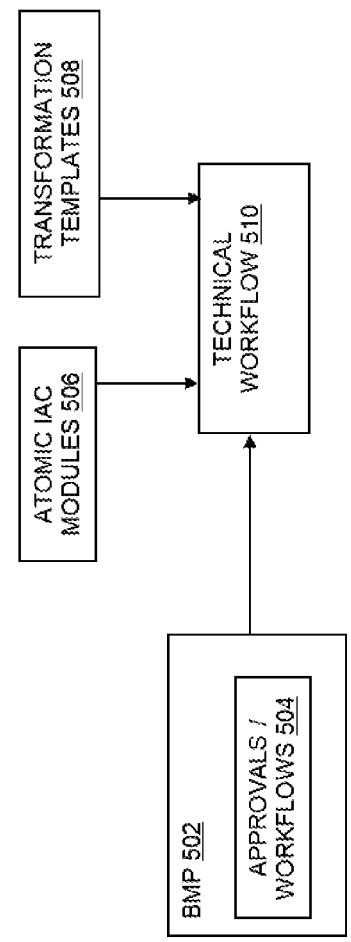
FIG. 5 depicts an example process flow for building a technical workflow for provisioning a requested infrastructure using atomic Infrastructure as Code modules in accordance with aspects described herein.

FIG. 5 depicts an example process flow for building a technical workflow of a requested infrastructure using atomic Infrastructure as Code modules in accordance with aspects described herein. The BPM software 502 invokes and coordinates business workflows (approval/workflows 504) which, assuming are satisfied, lead to a selection of the proper atomic IaC modules 506 and transformation templates 508 as input to a technical workflow component (#104 of FIG. 1) that produces the technical workflow 510, which is a final definition of the infrastructure using specific atomic IaC modules, for the orchestration function to execute.

Figure 6A:
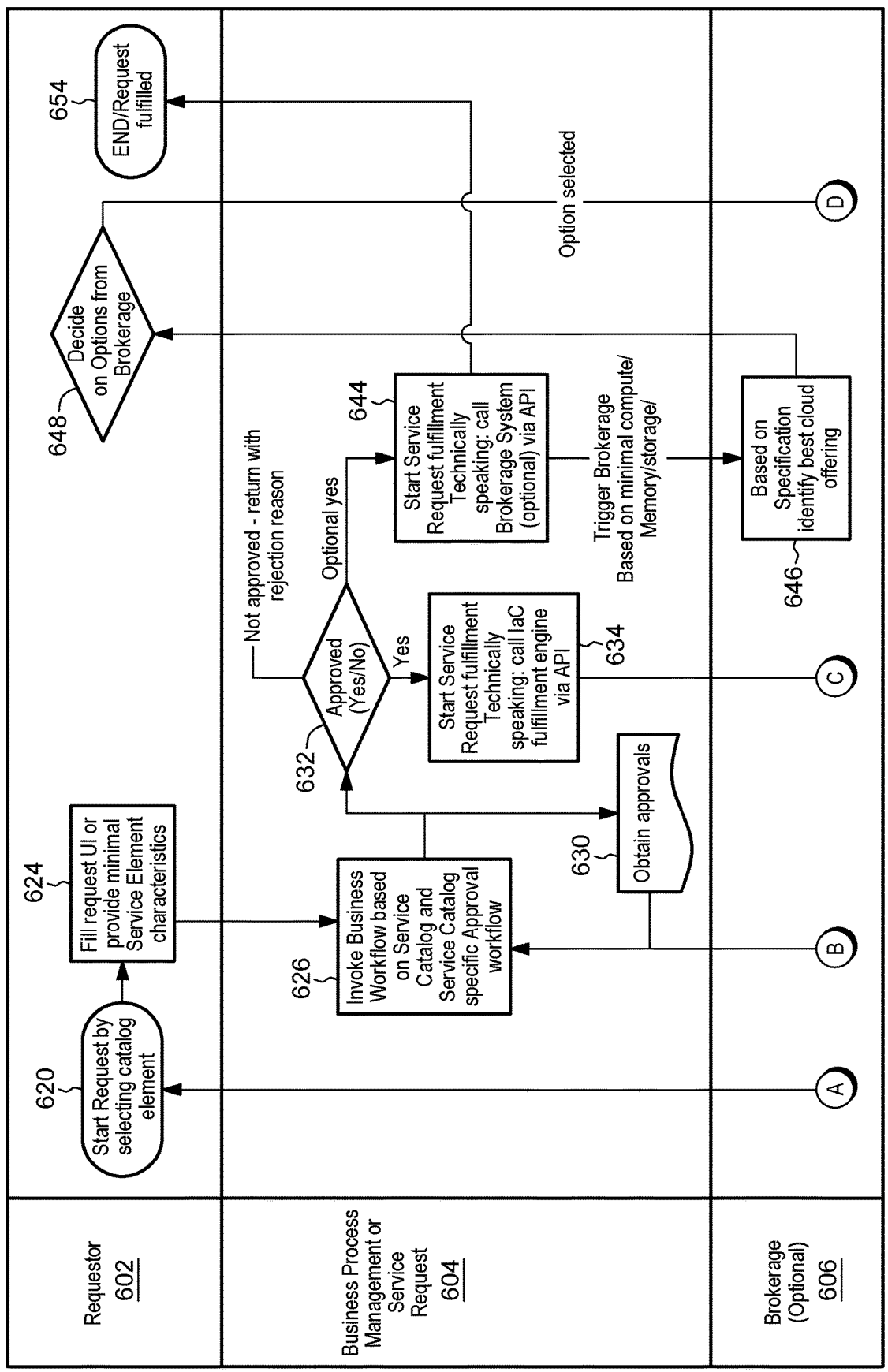
FIGS. 6A-6C depict an example process flow for provisioning infrastructure elements in a target environment via execution of atomic Infrastructure as Code modules, in accordance with aspects described herein.
Figure 6B:
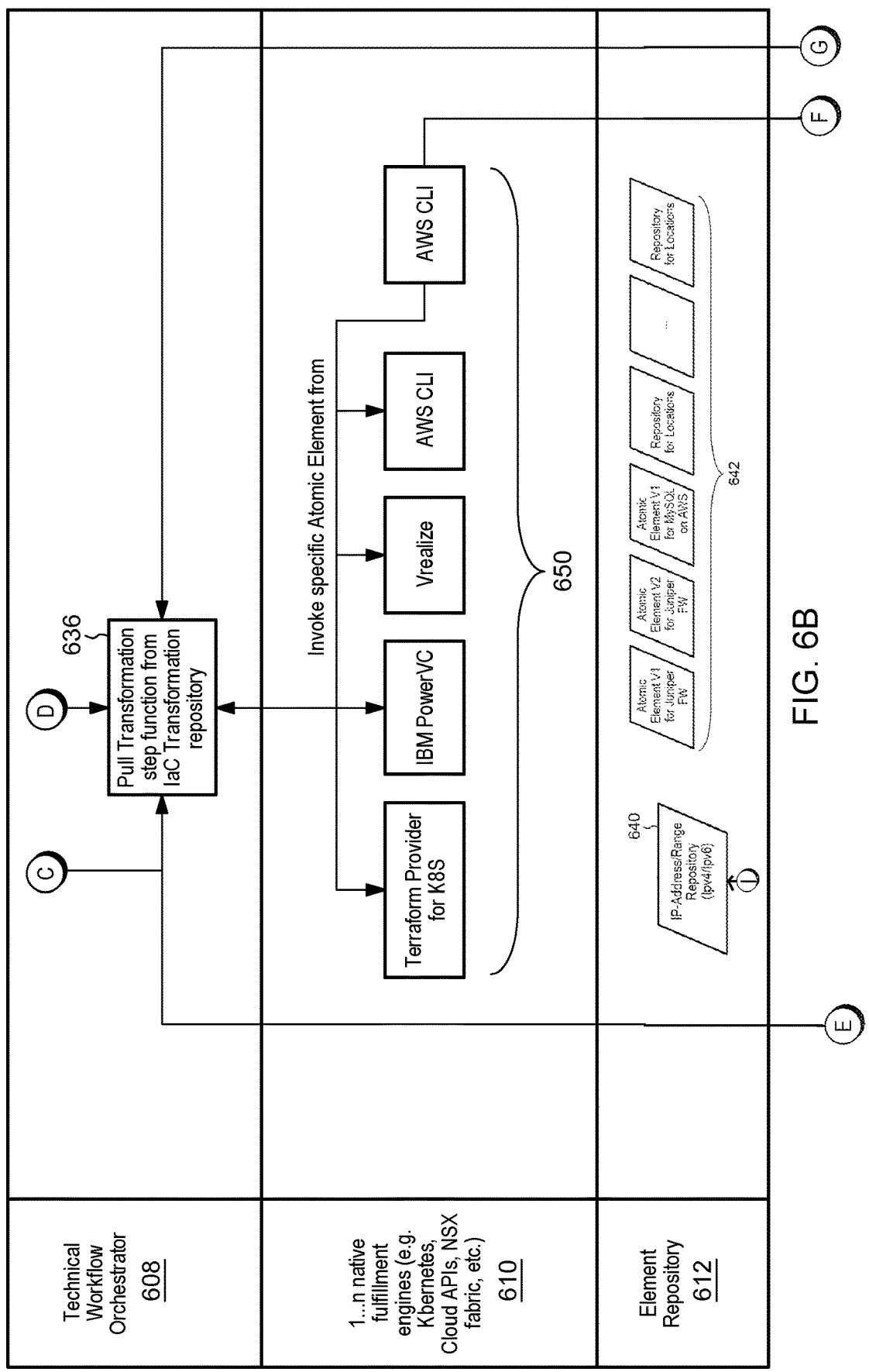
Figure 6C:
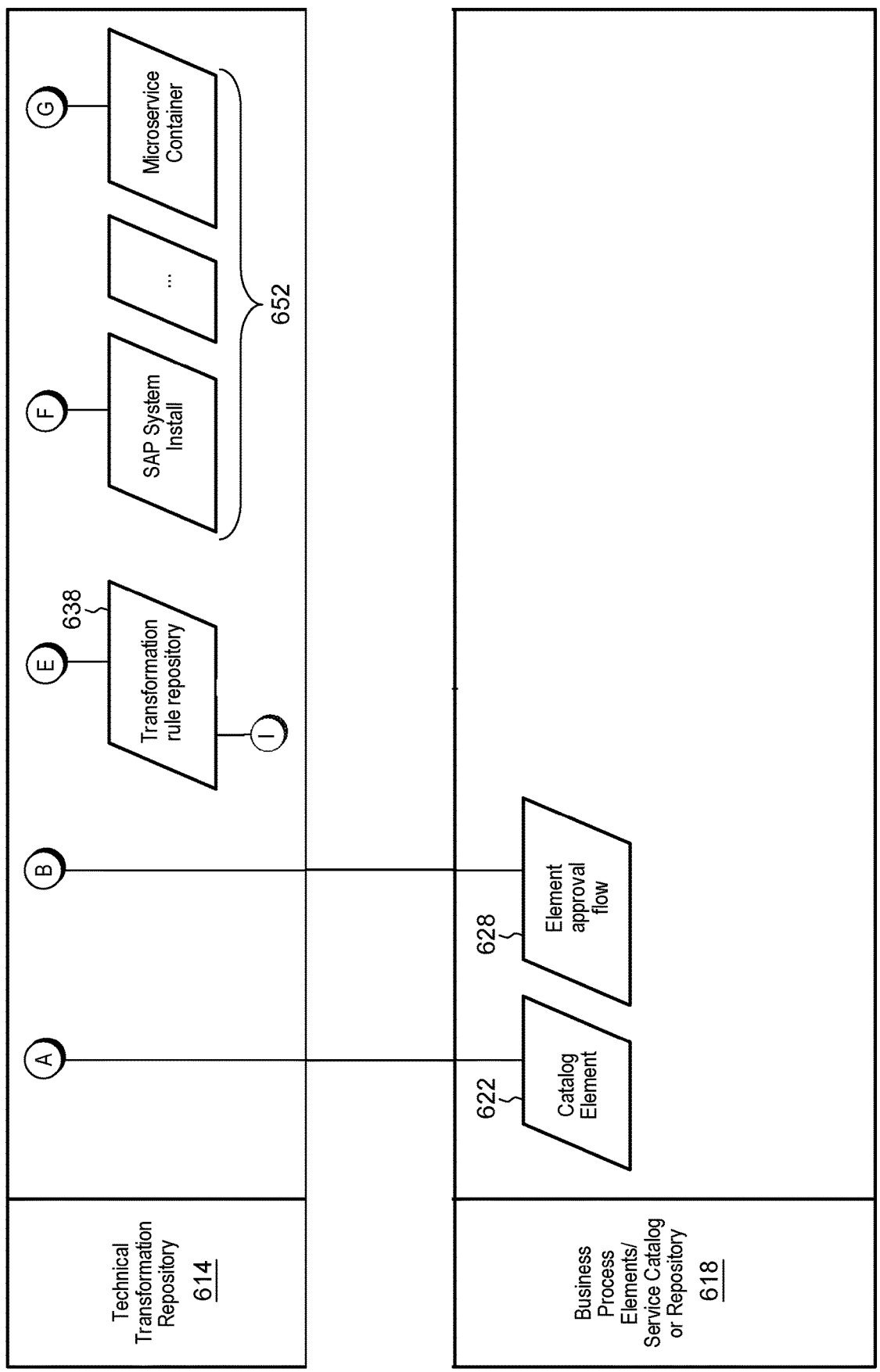

FIGS. 6A-6C depict an example process flow for provisioning infrastructure elements in a target environment via execution of atomic Infrastructure as Code modules, in accordance with aspects described herein. The process flow depicts the interrelation between the business process, an IaC transformation pattern/template, and the atomic IaC modules.

A requestor 602, e.g. a user or computer system/software acting on behalf of a user, starts the request by selecting (620) a catalog element 622. Catalog elements are selected from business process elements/service catalog or repository 618. This fills (624) the request user interface and/or provides minimal service element characteristics. Elements of 618 include various repositories. An element repository 612 houses atomic IaC modules 642 and repositories thereof.

In embodiments, the service request is made intentionally simple; the requestor may not need to specify technical details like specific firewall rules, network elements, storage paths, internet protocol (IP) addresses, load balancer configurations and the like. In some examples, some or all are prior-configured in transformation template(s) and/or implied based on knowledge about the enterprise. An example service request could be "I want a SAP System in Stage Test for Project X (selected from a drop-down list populated from an element repository) in Region EMEA (also selected from a drop-down list) of Platform T-Shirt size (S/M/L bespoke). If bespoke is selected, central processor unit (CPU) type and number of CPUs, memory size, and storage size can be specified separately.

Continuing with FIG. 6, the process proceeds with business process management or service request 604 invoking (626) a business workflow based on the service catalog and service catalog specific approval workflow. An element approval flow 628 is pulled from business process elements/service catalog or repository 618. The invoked business workflow is subject to approvals in this example. The process seeks to obtain (630) the proper approvals. An inquiry 632 is made as to whether the workflow is approved. If so, (632, Yes) the service fulfillment is started (634) by calling an IaC fulfillment engine via an application programming interface (API). The process then proceeds with a technical workflow orchestrator/component 608 pulling (636) transformation step function(s) from the IaC transformation repository. A transformation rule repository 638 of a technical transformation repository 614 provides transformation rules. The transformation templates are or include the transformation rules. In the example of an IP Range element, the transformation rule repository 638 accesses, for instance, an IP address range repository 640. Transformation rule repository 638 may be a set of transformational objects similar to a "make file" that contains the flow of scripts, API or command line interface (CLI) calls or other transformation rules necessary to create the requested business service request. As an example, in order for the SAP system request from above to be fulfilled, a SAP transformation ruleset is selected that defines in a first step transformational information that a SAP system is.

The technical workflow orchestrator 608 pulls the step functions from the IaC transformation library in order to invoke the appropriate specific atomic elements from one or more fulfillment engines 650 of the native fulfillment engines 610 when orchestrating the provisioning of the infrastructure.

Returning to inquiry 632 if instead the workflow is approved with an 'optional Yes' the process proceeds to 644 where it starts service request fulfillment by calling a brokerage system via an API. This scenario is the case where there is some flexibility in the approval and actual infrastructure implemented. The brokerage system aids in the identification of a specific infrastructure from multiple options. Here, starting (644) the service request fulfillment triggers brokerage based on, e.g. the minimal required infrastructure parameters (e.g. minimal compute, memory, and/or storage, as examples). The brokerage component 606 then, based on the specification, identifies (646) best hosting environment(s) and infrastructure. The process proceeds to 648 where the requestor decides between options presented by the brokerage component. Then, based on the requested selection from the presented options, the process proceeds to 636 to pull the transformation step function(s) from the IaC transformation library.

In the example of FIGS. 6A-6C, when a SAP system install is requested, 636 invokes atomic IaC modules via the AWS CLI. This initiates in the technical transform repository 614 the SAP system install with a SAP system install microcontainer service (652) in this example.

Returning to inquiry 632, under the 'Yes' and 'Optional yes' scenarios, the process at 636 pulls the step function(s) from the IaC transformation library. Then, or if at inquiry 632 the workflow was not approved in the first place, the process ends 654 with the request having been fulfilled (or returning a rejection reason in the case that the workflow was not approved).

Figure 7:
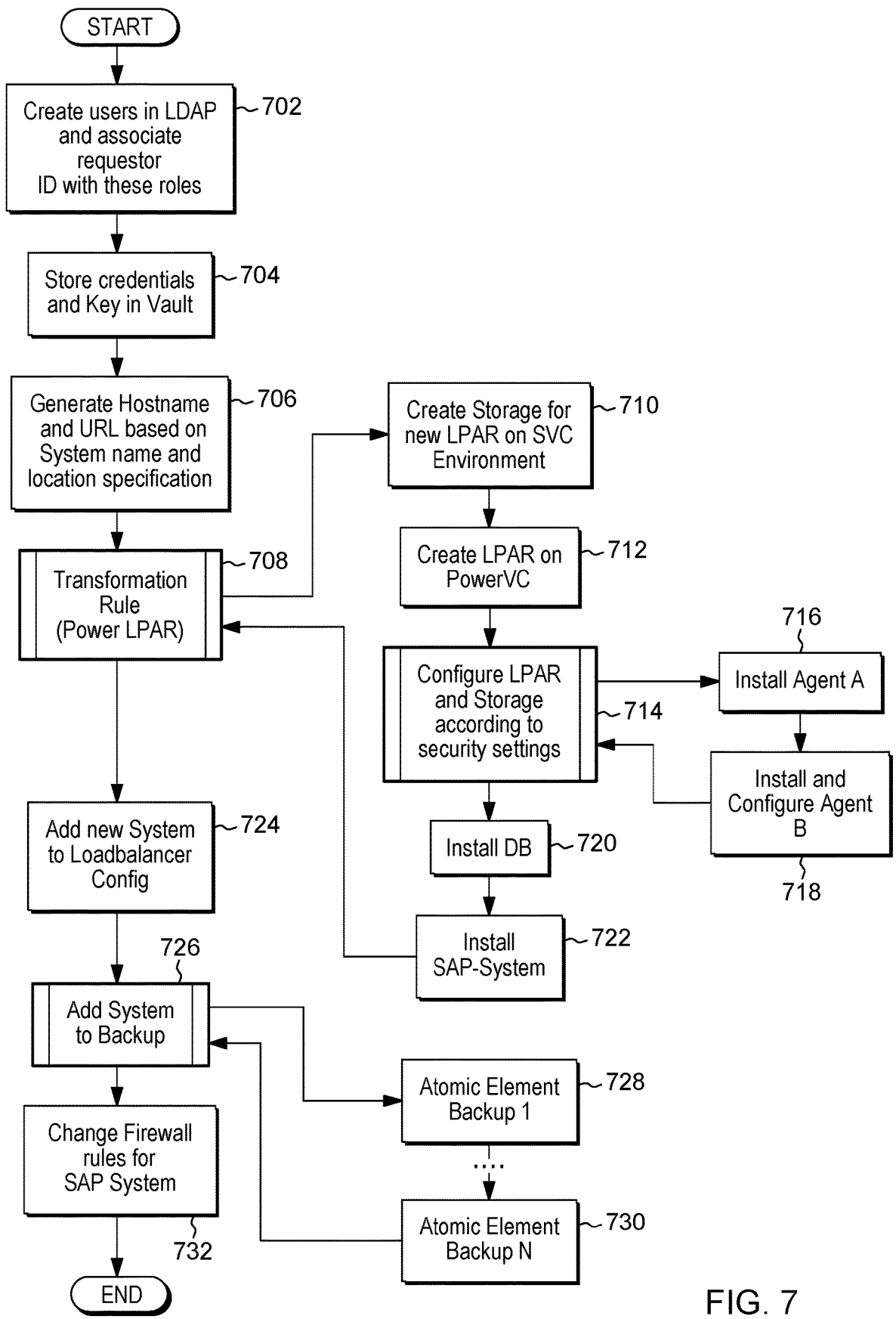
FIG. 7 depicts an example transformation rule and atomic Infrastructure as Code module invocation tree, in accordance with aspects described herein.

FIG. 7 depicts an example transformation rule and atomic Infrastructure as Code module invocation tree, in accordance with aspects described herein. Installation, configuration, invocation, etc. of aspects of the tree are effected by executing the appropriate atomic IaC modules. The process starts with a request. The example request in FIG. 7 is for a SAP production system in on AIX in a private, on-premises cloud hosting environment in locale Germany. The process creates (702) users in the lightweight directory access protocol (LDAP) and associates the requestor identifier with these roles. Using the example, it creates users for SAP-SYSTEM in the company LDAP with specified SAP-SID names (p01adm and orap01, for example). The process then proceeds by storing (704) credentials and keys in the vault. Using the example, the process generates SSH keys for the new IDs and stores the keys in the vault. The process generates (706) the hostname and URL based on the system name and location specification and invokes (708) a transformation rule for a Power Architecture® LPAR (POWER ARCHITECTURE is a registered trademark of International Business Machines Corporation). Aspect 708 follows a sub flow by first creating (710) storage for the new LPAR on an SVC environment, then creating (712) the LPAR on PowerVC™ (offered by International Business Machines Corporation, and of which PowerVC is a trademark), and configuring (714) the LPAR and storage according to desired security settings. This configuring itself includes a sub flow of installing (716) an associated agent A and installing (718) and configuring an associated agent B. After configuring (714) the LPAR and storage, the process installs (720) the database and installs (722) the SAP-SYSTEM. This completes the transformation rule process (708). The overall process of FIG. 7 then continues by adding (724) the new system to the load balancer configuration, and adding (726) the system to Backup. This includes adding atomic backup element(s) 1 through N (728, . . . , 730). The process then changes/adds (732) appropriate firewall rules for the SAP system and ends. Directives, parameters, and other guiding information for effecting the above provisioning can all be housed in transformation rule/template(s). The service request can be transformed into a technical workflow represented by the invocation tree of FIG. 7 based on the transformation template(s), atomic IaC modules, any other service request parameters, and the technical workflow component can orchestrate the actual provisioning of the infrastructure by leveraging the provisioning components (108) to provision and configure the appropriate infrastructure elements consistent with the invocation tree and desired customer environment specifications.

Accordingly, processes for automation utilizing infrastructure as code modules are provided in accordance with aspects described herein. Example such processes are depicted in and described with reference to FIGS. 8A and 8B.

Figure 8A:
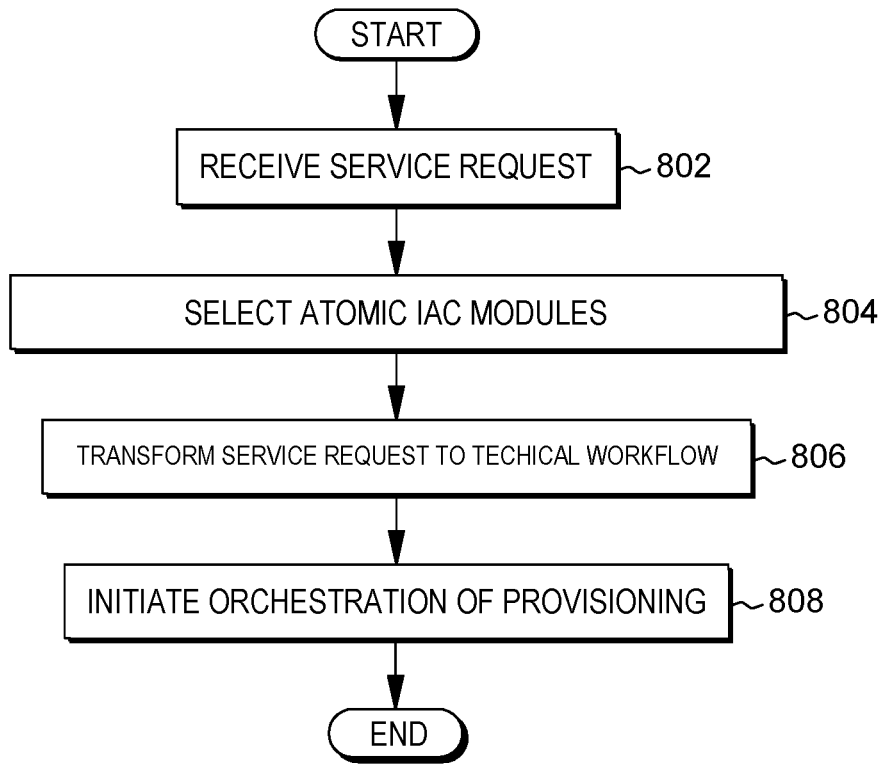
FIGS. 8A-8B depict example processes for automation utilizing infrastructure as code modules, in accordance with aspects described herein.

FIG. 8A depicts an example of automation utilizing infrastructure as code modules in accordance with aspects described herein. In some examples, the process is performed by one or more computer systems, such as those described herein, which may include one or more computer systems providing a business process management system or communication therefore, one or more cloud servers, and/or one or more other computer systems.

The process begins by receiving (802) a service request implicating computer infrastructure elements for provisioning in a target hosting environment. In examples, the service request is constructed of selected catalog elements that implicate certain infrastructure elements that are to be provisioned.

The process selects (804) a set of atomic Infrastructure as Code (IaC) modules comprising code definitions for execution to provision the infrastructure elements in the target hosting environment. The atomic IaC modules are selected from a library of predefined executable atomic IaC modules that include atomic IaC modules for execution to provision varying infrastructure elements in varying hosting environments including the target hosting environment.

In some embodiments, the varying infrastructure elements include computational infrastructure elements, network connectivity infrastructure elements, firewall service infrastructure services, middleware infrastructure elements, database infrastructure elements, input/output infrastructure elements, and/or operating system infrastructure elements. A subset/group of atomic IaC modules in the library may be for execution to provision a common type of infrastructure element, with each atomic IaC module of the group of atomic IaC modules being for execution to provision the common type of infrastructure element in a different hosting environment of the varying hosting environments. An example type of infrastructure element is a virtual machine and, by the above, the different atomic IaC modules of the group are to invoke this type of element (a VM), but in different environments. Additionally or alternatively, a subset/group of atomic IaC modules in the library can be for execution to provision differing first and second types of infrastructure elements, in differing first and second hosting environments of the varying hosting environments, that perform a common function. Selection of the first hosting environment or second hosting environment, as the target hosting environment, could select the first type of infrastructure element or second type of infrastructure element, respectively, to perform the common function. A common function may be compute power, with the different types of infrastructure elements being a virtual machine and a container, for example.

Returning to FIG. 8A, the process transforms (806) the service request into a technical workflow using the selected atomic IaC modules and transformation template(s) that direct invocation of the set of atomic IaC modules using desired parameters for provisioning the infrastructure elements in the target hosting environment. Then the process initiates orchestration (808) of the provisioning of the infrastructure elements in the target environment via execution of the selected set of atomic IaC modules. In some examples, the orchestration of the provisioning itself is performed by different component(s) than the component performing the aspects of FIG. 8A.

In some embodiments, the process of FIG. 8A further includes integrating with a workflow approval process in which provisioning of at least some of the infrastructure elements is subject to one or more flexible approvals. Parameters of the one or more flexible approvals can differ according to the hosting environment, of the varying hosting environments, in which the at least some of the infrastructure elements are to be provisioned. Example parameters are cost, latency, and region, though many others are possible. The transforming the service request into the technical workflow can therefore consider the parameters of at least one flexible approval of the one or more flexible approvals to inform optimized selection among available infrastructure elements to provision in fulfilling the service request. This could be performed by a brokerage component, for instance. Options for the selection among the available infrastructure elements can then be presented to a user for selecting.

Figure 8B:
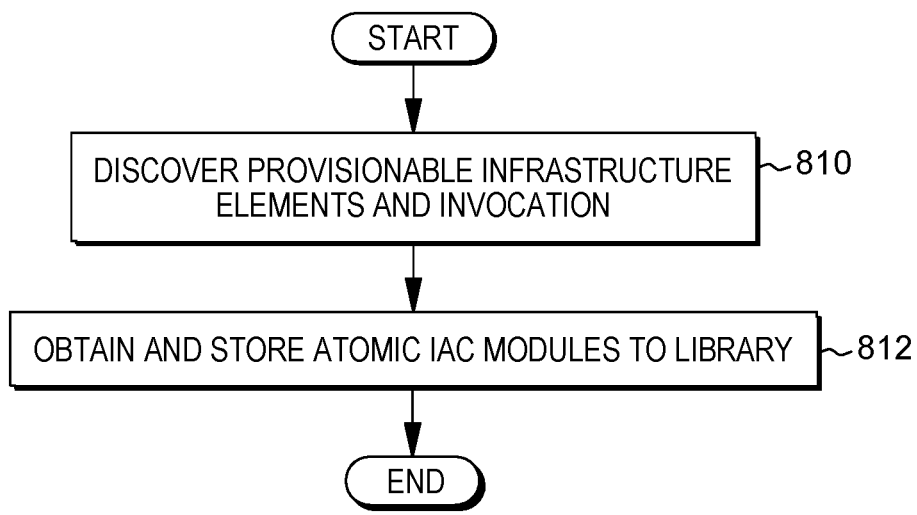

FIG. 8B depicts an example process for maintaining a library of predefined executable atomic IaC modules to support the process of FIG. 8A. The process of FIG. 8B includes discovering (810) provisionable infrastructure elements of the varying hosting environments and definitions for invoking the provisionable infrastructure elements in the varying hosting environments. This discovering could include discovery by looking at specifications published by the hosting environment provider describing how to invoke elements and/or discovering by way of a private discovery process that an unrelated entity might initiate and run to discover the invocations, for instance if they are not readily made available by the hosting environment provider or otherwise. As a special case of FIG. 8B, the process identifies a new hosting environment to be supported for receiving service requests to provision particular infrastructure elements in the new hosting environment, and, based on identifying the new hosting environment performs the discovery processing (810).

The process continues by obtaining and storing (812) to the library additional atomic IaC modules, the additional IaC modules configured for execution to provision the particular infrastructure elements in the subject hosting environment. As an example, the obtaining includes creating one or more executable atomic IaC modules for the library based on newly found definitions and/or based on changes to a definition for invoking a given infrastructure element, in which case the corresponding atomic IaC module in the library is updated based on the changed definition.

Although various examples are provided, variations are possible without departing from a spirit of the claimed aspects.

Figure 9:
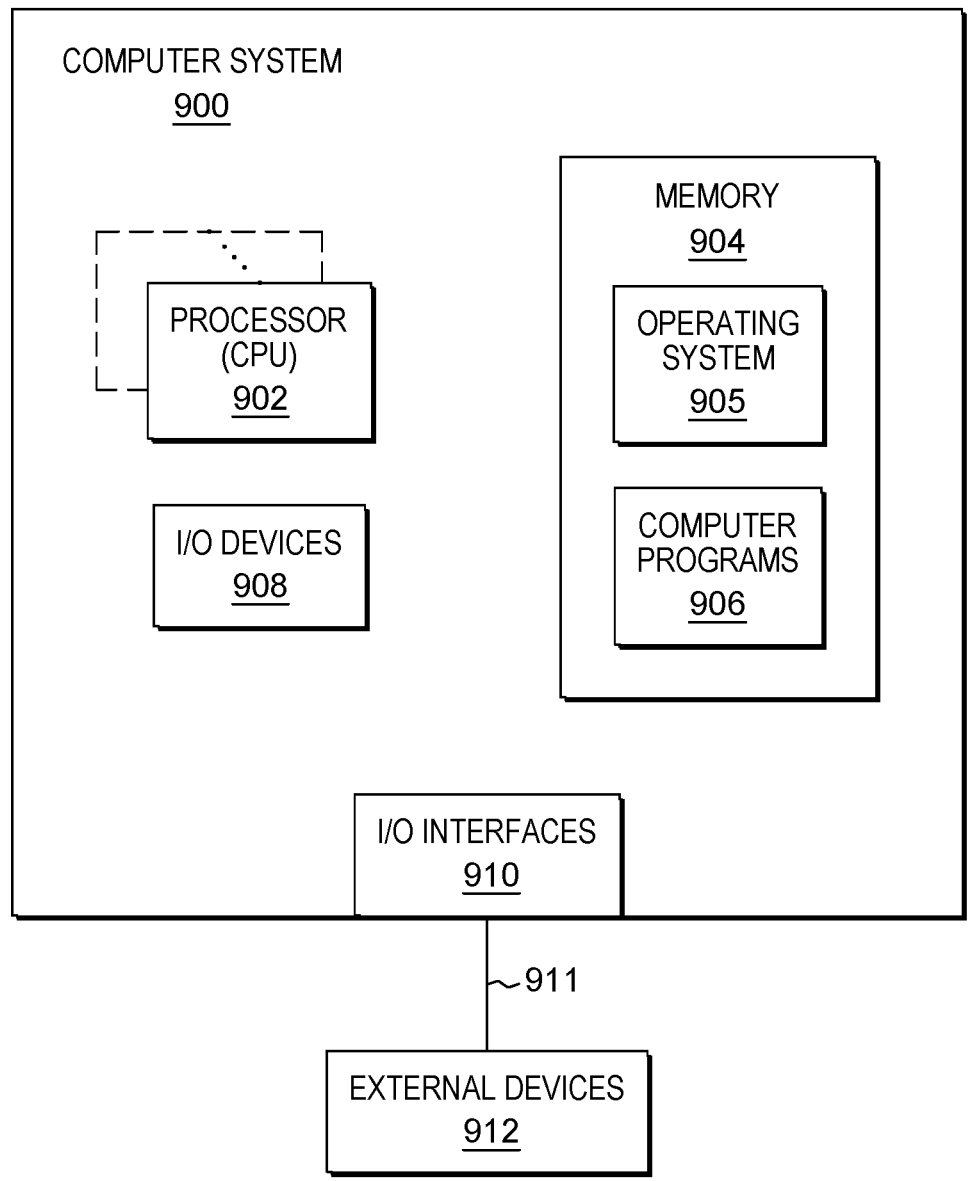
FIG. 9 depicts one example of a computer system and associated devices to incorporate and/or use aspects described herein.

Processes described herein may be performed singly or collectively by one or more computer systems, such as one or more BPM servers, client computing devices, hosted servers, or a combination of the foregoing, as examples. FIG. 9 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 9 shows a computer system 900 in communication with external device(s) 912. Computer system 900 includes one or more processor(s) 902, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 902 can also include register(s) to be used by one or more of the functional components. Computer system 900 also includes memory 904, input/output (I/O) devices 908, and I/O interfaces 910, which may be coupled to processor(s) 902 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 904 can be or include main or system memory (e.g. Random Access Memory) used in the execution of program instructions, storage device(s) such as hard drive(s), flash media, or optical media as examples, and/or cache memory, as examples. Memory 904 can include, for instance, a cache, such as a shared cache, which may be coupled to local caches (examples include L1 cache, L2 cache, etc.) of processor(s) 902. Additionally, memory 904 may be or include at least one computer program product having a set (e.g., at least one) of program modules, instructions, code or the like that is/are configured to carry out functions of embodiments described herein when executed by one or more processors.

Memory 904 can store an operating system 905 and other computer programs 906, such as one or more computer programs/applications that execute to perform aspects described herein. Specifically, programs/applications can include computer readable program instructions that may be configured to carry out functions of embodiments of aspects described herein.

Examples of I/O devices 908 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (912) coupled to the computer system through one or more I/O interfaces 910.

Computer system 900 may communicate with one or more external devices 912 via one or more I/O interfaces 910. Example external devices include a keyboard, a pointing device, a display, and/or any other devices that enable a user to interact with computer system 900. Other example external devices include any device that enables computer system 900 to communicate with one or more other computing systems or peripheral devices such as a printer. A network interface/adapter is an example I/O interface that enables computer system 900 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 910 and external devices 912 can occur across wired and/or wireless communications link(s) 911, such as Ethernet-based wired or wireless connections. Example wireless connections include cellular, Wi-Fi, Bluetooth®, proximity-based, near-field, or other types of wireless connections. More generally, communications link(s) 911 may be any appropriate wireless and/or wired communication link(s) for communicating data.

Particular external device(s) 912 may include one or more data storage devices, which may store one or more programs, one or more computer readable program instructions, and/or data, etc. In addition, external device(s) 912 can include external networking devices, such as firewalls, routers, switches, virtual private network (VPN) gateways, and the like, loadbalancers, external storage devices and/or facilities for configuration of mechanisms for service management, such as logging, monitoring, event management, and the like. Computer system 900 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 900 may be operational with numerous other general purpose or special purpose computing system environments or configurations. Computer system 900 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

This can be extended to any type of device, for instance Internet-of-Things (IoT) device(s)/sensor(s) that could be targets of aspects described herein (e.g. form at last part of a target hosting environment) to properly perform their configuration based on specifications. For instance, multipurpose or generic IoT devices might perform different tasks based on their specific geographic location, time of day, type of measurement to be performed, target server to send data to, and so on. Atomic IaC modules and transformation templates parameterizing the atomic IaC element instantiation pursuant to desired specifications could be leveraged to configure such devices, as the target hosting environment, pursuant to a service request. In some examples, one or more IoT devices themselves could be a (machine) service requestor that request service(s) to be automatically configured once powered on.

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
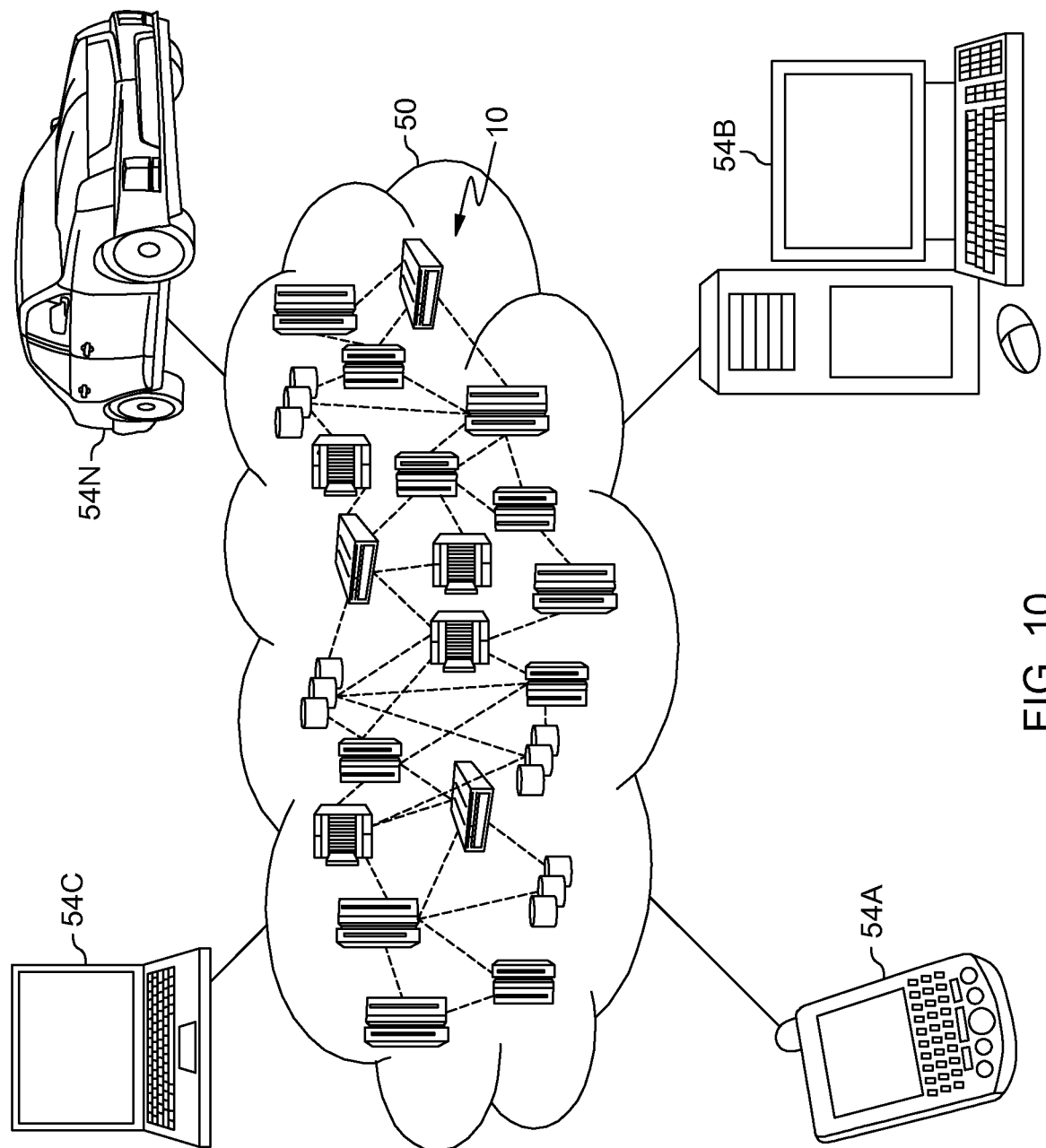
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser). It is noted that node(s) 10 and/or cloud consumers could be or include Internet-of-Things (IoT) devices/sensors.

Figure 11:
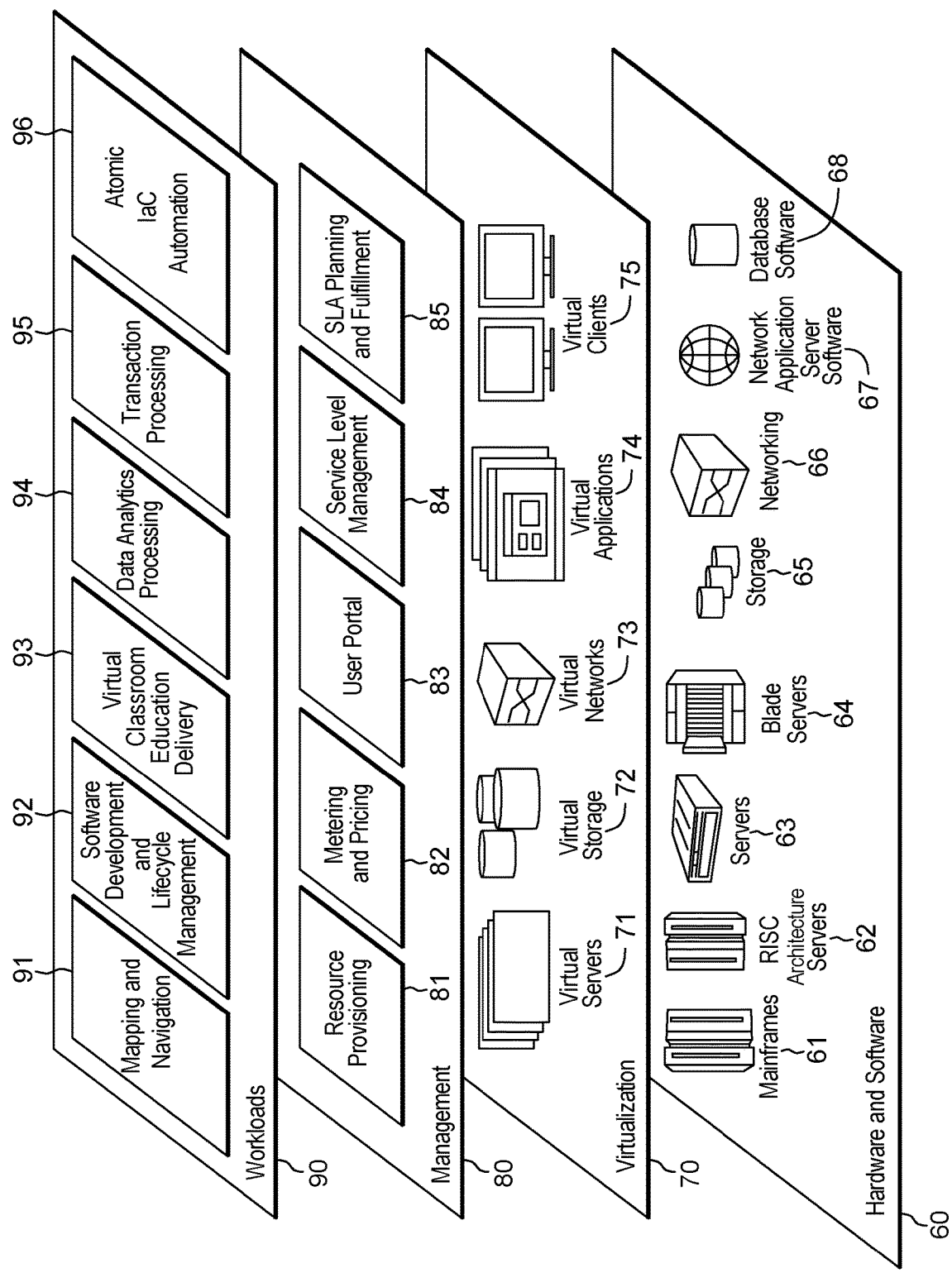
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and atomic IaC-based automation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving a service request implicating computer infrastructure elements for provisioning in a target hosting environment;
selecting a set of atomic Infrastructure as Code (IaC) modules comprising code definitions for execution to provision the infrastructure elements in the target hosting environment, the set of atomic IaC modules being selected from a library of predefined executable atomic IaC modules that include atomic IaC modules for execution to provision varying infrastructure elements in varying hosting environments including the target hosting environment;
transforming the service request into a technical workflow using at least the selected set of atomic IaC modules and one or more transformation templates that direct invocation of the set of the atomic IaC modules using desired parameters for provisioning the infrastructure elements in the target hosting environment; and initiating orchestration of the provisioning of the infrastructure elements in the target hosting environment via execution of the selected set of atomic IaC modules.

2. The method of claim 1, further comprising maintaining the library of predefined executable atomic IaC modules, the maintaining comprising identifying a new hosting environment to be supported for receiving service requests to provision particular infrastructure elements in the new hosting environment, and, based on identifying the new hosting environment, obtaining and storing to the library additional atomic IaC modules, the additional IaC modules configured for execution to provision the particular infrastructure elements in the new hosting environment.

3. The method of claim 2, wherein the maintaining further comprises:
  discovering provisionable infrastructure elements of the varying hosting environments and definitions for invoking the provisionable infrastructure elements in the varying hosting environments; and
  creating one or more executable atomic IaC modules for the library based on the definitions.

4. The method of claim 3, wherein the maintaining further comprises, based on changes to a definition for invoking a given infrastructure element, updating a corresponding atomic IaC module in the library that is based on the changed definition.

5. The method of claim 1, wherein a group of atomic IaC modules in the library are for execution to provision a common type of infrastructure element, and each atomic IaC module of the group of atomic IaC modules is for execution to provision the common type of infrastructure element in a different hosting environment of the varying hosting environments.

6. The method of claim 1, wherein a group of atomic IaC modules in the library are for execution to provision differing first and second types of infrastructure elements, in differing first and second hosting environments of the varying hosting environments, that perform a common function, wherein selection of the first hosting environment or second hosting environment, as the target hosting environment, selects the first type of infrastructure element or second type of infrastructure element, respectively, to perform the common function.

7. The method of claim 1, further comprising integrating with a workflow approval process in which provisioning of at least some of the infrastructure elements is subject to one or more flexible approvals, wherein parameters of the one or more flexible approvals differ according to the hosting environment, of the varying hosting environments, in which the at least some of the infrastructure elements are to be provisioned.

8. The method of claim 7, wherein the transforming the service request into the technical workflow considers the parameters of at least one flexible approval of the one or more flexible approvals to inform optimized selection among available infrastructure elements to provision in fulfilling the service request.

9. The method of claim 8, wherein options for the selection among the available infrastructure elements are presented to a user for selecting.

10. The method of claim 1, wherein the varying infrastructure elements comprise: computational infrastructure elements, network connectivity infrastructure elements, firewall service infrastructure services, middleware infrastructure elements, database infrastructure elements, input/output infrastructure elements, and operating system infrastructure elements.

11. A computer system comprising:
a memory; and
a processor in communication with the memory, wherein the computer system is configured to perform a method comprising:
  receiving a service request implicating computer infrastructure elements for provisioning in a target hosting environment;
  selecting a set of atomic Infrastructure as Code (IaC) modules comprising code definitions for execution to provision the infrastructure elements in the target hosting environment, the set of atomic IaC modules being selected from a library of predefined executable atomic IaC modules that include atomic IaC modules for execution to provision varying infrastructure elements in varying hosting environments including the target hosting environment;
  transforming the service request into a technical workflow using at least the selected set of atomic IaC modules and one or more transformation templates that direct invocation of the set of the atomic IaC modules using desired parameters for provisioning the infrastructure elements in the target hosting environment; and
  initiating orchestration of the provisioning of the infrastructure elements in the target hosting environment via execution of the selected set of atomic IaC modules.

12. The computer system of claim 11, wherein the method further comprises:
  maintaining the library of predefined executable atomic IaC modules, the maintaining comprising identifying a new hosting environment to be supported for receiving service requests to provision particular infrastructure elements in the new hosting environment, and, based on identifying the new hosting environment, obtaining and storing to the library additional atomic IaC modules, the additional IaC modules configured for execution to provision the particular infrastructure elements in the new hosting environment;
  discovering provisionable infrastructure elements of the varying hosting environments and definitions for invoking the provisionable infrastructure elements in the varying hosting environments;
  creating one or more executable atomic IaC modules for the library based on the definitions; and
  based on changes to a definition for invoking a given infrastructure element, updating a corresponding atomic IaC module in the library that is based on the changed definition.

13. The computer system of claim 11, wherein a group of atomic IaC modules in the library are for execution to provision differing first and second types of infrastructure elements, in differing first and second hosting environments of the varying hosting environments, that perform a common function, wherein selection of the first hosting environment or second hosting environment, as the target hosting environment, selects the first type of infrastructure element or second type of infrastructure element, respectively, to perform the common function.

14. The computer system of claim 11, wherein the method further comprises integrating with a workflow approval process in which provisioning of at least some of the infrastructure elements is subject to one or more flexible approvals, wherein parameters of the one or more flexible approvals differ according to the hosting environment, of the varying hosting environments, in which the at least some of the infrastructure elements are to be provisioned.

15. The computer system of claim 14, wherein the transforming the service request into the environment-specific template considers the parameters of at least one flexible approval of the one or more flexible approvals to inform optimized selection among available infrastructure elements to provision in fulfilling the service request.

16. The computer system of claim 11, wherein the varying infrastructure elements comprise: computational infrastructure elements, network connectivity infrastructure elements, firewall service infrastructure services, middleware infrastructure elements, database infrastructure elements, input/output infrastructure elements, and operating system infrastructure elements.

17. A computer program product comprising:
a computer readable storage medium readable by a processing circuit and storing instructions for execution by the processing circuit for performing a method comprising:
receiving a service request implicating computer infrastructure elements for provisioning in a target hosting environment;
selecting a set of atomic Infrastructure as Code (IaC) modules comprising code definitions for execution to provision the infrastructure elements in the target hosting environment, the set of atomic IaC modules being selected from a library of predefined executable atomic IaC modules that include atomic IaC modules for execution to provision varying infrastructure elements in varying hosting environments including the target hosting environment;
transforming the service request into a technical workflow using at least the selected set of atomic IaC modules and one or more transformation templates that direct invocation of the set of the atomic IaC modules using desired parameters for provisioning the infrastructure elements in the target hosting environment; and
initiating orchestration of the provisioning of the infrastructure elements in the target hosting environment via execution of the selected set of atomic IaC modules.

18. The computer program product of claim 17, wherein the method further comprises:
maintaining the library of predefined executable atomic IaC modules, the maintaining comprising identifying a new hosting environment to be supported for receiving service requests to provision particular infrastructure elements in the new hosting environment, and, based on identifying the new hosting environment, obtaining and storing to the library additional atomic IaC modules, the additional IaC modules configured for execution to provision the particular infrastructure elements in the new hosting environment;
discovering provisionable infrastructure elements of the varying hosting environments and definitions for invoking the provisionable infrastructure elements in the varying hosting environments;
creating one or more executable atomic IaC modules for the library based on the definitions; and
based on changes to a definition for invoking a given infrastructure element, updating a corresponding atomic IaC module in the library that is based on the changed definition.

19. The computer program product of claim 17, wherein a group of atomic IaC modules in the library are for execution to provision differing first and second types of infrastructure elements, in differing first and second hosting environments of the varying hosting environments, that perform a common function, wherein selection of the first hosting environment or second hosting environment, as the target hosting environment, selects the first type of infrastructure element or second type of infrastructure element, respectively, to perform the common function.

20. The computer program product of claim 17, wherein the method further comprises integrating with a workflow approval process in which provisioning of at least some of the infrastructure elements is subject to one or more flexible approvals, wherein parameters of the one or more flexible approvals differ according to the hosting environment, of the varying hosting environments, in which the at least some of the infrastructure elements are to be provisioned, wherein the transforming the service request into the environment-specific template considers the parameters of at least one flexible approval of the one or more flexible approvals to inform optimized selection among available infrastructure elements to provision in fulfilling the service request.

* * * * *